United States Patent Office 3,592,866
Patented July 13, 1971

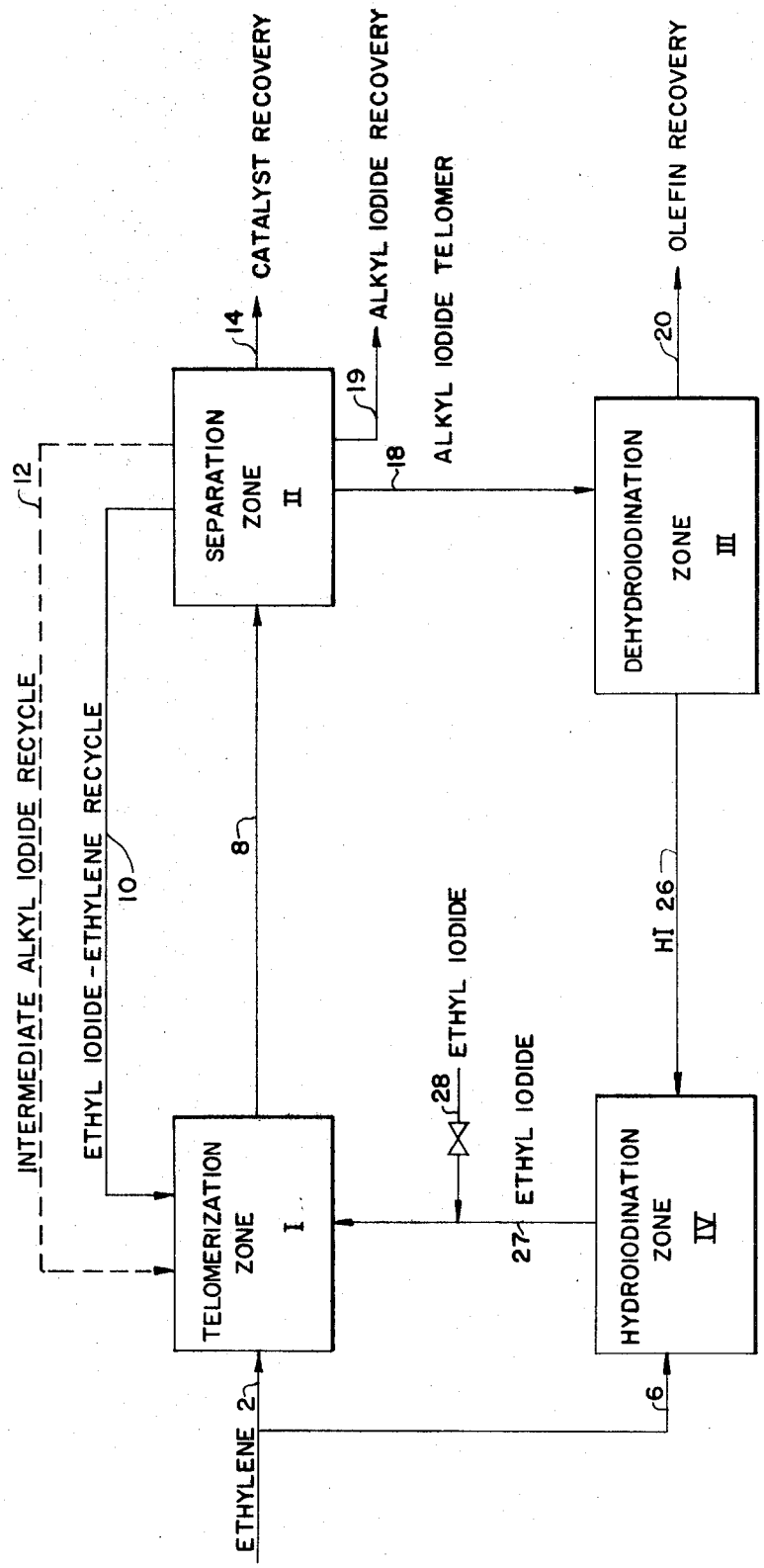

3,592,866
ALPHA-OLEFIN PRODUCTION
Eugene F. Magoon, Walnut Creek, and Lynn H. Slaugh,
Lafayette, Calif., assignors to Shell Oil Company, New
York, N.Y.
Filed June 11, 1969, Ser. No. 832,218
Int. Cl. C07c 9/00, 11/02
U.S. Cl. 260—677H
6 Claims

ABSTRACT OF THE DISCLOSURE

Ethylene is converted to linear alpha-olefins by (1) telomerizing ethylene and ethyl iodide to linear primary alkyl iodides (2) separating and dehydroiodinating the alkyl iodides to produce linear alpha-olefins and hydrogen iodide and (3) hydroiodinating ethylene with the hydrogen iodide to produce ethyl iodide for recycle to provide the ethyl iodide for telomerization with ethylene.

BACKGROUND OF THE INVENTION

Linear alpha-olefins are compounds of established utility in a variety of applications. Such olefins, particularly $C_{14}$–$C_{20}$, are converted to alpha-olefin sulfonates, e.g., as by treatment with sulfur trioxide, which are useful as biodegradable detergents. Alternatively, such olefins are converted to corresponding alcohols as by conventional "Oxo" processes or sulfuric acid catalyzed hydration. The $C_{12}$–$C_{20}$ alcohols thus produced are ethoxylated with ethylene oxide in the presence of a basic catalyst, e.g., sodium hydroxide, to form conventional detergents and lower molecular weight alcohols are esterified with polyhydric acids, e.g., phthalic acid, to form plasticizers for polyvinyl chloride.

It would be useful to prepare linear, terminal olefins by a process which utilizes readily available ethylene as the starting material. Particularly useful would be a process which converts ethylene to alpha-olefins of a selected range of carbon atoms.

SUMMARY OF THE INVENTION

It has now been found that linear alpha-olefins can be produced from ethylene in a cyclic-type process which comprises: (1) telomerizing ethylene and ethyl iodide to produce linear primary alkyl iodide telomers in the presence of iron metal, copper metal, zinc metal, a copper chelate of a β-dicarbonylic compound monoenolate or a low-valent organometallic compound of a metal of Groups VI–B, VII–B or VIII of the Periodic Table; (2) separating and dehydroiodinating the alkyl iodide telomers to produce linear alpha-olefins and hydrogen iodide; (3) hydroiodinating ethylene with the hydrogen iodide to produce ethyl iodide for recycle and further telomerization with ethylene.

BRIEF DESCRIPTION OF THE DRAWING

For a better understanding of the invention, refer is to the accompanying drawing wherein the sole figure is a schematic flow diagram showing several modifications of the process of the invention. In the drawing, I designates a telomerization zone, II a separation zone, III a dehydroiodination zone and IV a hydroiodination zone. For convenience and clarity, apparatus not essential to a complete understanding of the invention such as means for providing heat, refrigeration, stirring, pressure control, cooling, separations and the like have been omitted from the drawing. The selection and location of such means will be apparent to one skilled in this art.

With reference to the drawing, one modification of the process may be summarized as follows: The telomerization catalyst, ethyl iodide and reaction diluent are charged to the telomerization reaction zone I, maintained at desired reaction conditions of temperature and pressure. Ethylene is introduced through line 2. The resulting reaction mixture comprising alkyl iodide telomers is removed through line 8 to a separation zone II wherein unreacted ethylene and ethyl iodide are separated and recycled through line 10. Any by-products and catalyst may be removed by line 14. The alkyl iodide telomers are passed through line 18 to the dehydroiodination zone III wherein the alkyl iodide telomers are converted to linear, alpha-olefins and hydrogen iodide. The olefins are recovered through line 20 and the hydrogen iodide is passed through line 26 to the hydroiodination zone IV wherein the hydrogen iodide is contacted with ethylene introduced through line 6 to produce ethyl iodide. The resulting ethyl iodide is recycled through line 27 to the telomerization reactor. Line 28 is provided for introducing ethyl iodide into the telomerization zone when starting up the process. Once underway, such introduction is stopped, except for any required makeup, and the necessary ethyl iodide reactant is continuously made available from the hydroiodination zone IV.

In another modification, which is a preferred modification, the alkyl iodide telomer products from the telomerization zone are separated in the separation zone II into a higher alkyl iodide telomer fraction of a selected range of carbon atoms, e.g., $C_{10}$–$C_{20}$, and an intermediate iodide telomer fraction of carbon atoms up to the lowest carbon number of the higher alkyl iodide fraction. The intermediate alkyl iodide fraction is recycled through line 12 to the telomerization zone for further reaction with ethylene to produce additional higher alkyl iodide products. The higher alkyl iodide fraction is passed through line 18 to the dehydroiodination zone III. In this modification, a selected range of higher alpha-olefins, preferably in the $C_{14}$–$C_{18}$ carbon range, is produced from ethylene. Alternatively, the higher alkyl iodide fraction is recovered as product through line 19, in which case ethyl iodide would not be available from the hydroiodination reactor and must be supplied to the telomerization zone through line 28.

DESCRIPTION OF PREFERRED EMBODIMENTS

Telomerization

The telomerization of ethylene and ethyl iodide to produce primary alkyl iodide telomers is conducted by contacting ethylene and ethyl iodide in the presence of a catalyst selected from iron metal, copper metal, zinc metal, a copper chelate of a β-dicarbonylic compound monoenolate, e.g., copper acetylacetonate, and a low valent organometallic compound of a metal of Groups VI–B, VII–B and VIII of the Periodic Table, e.g., chromium, molybdenum, tungsten, manganese, rhenium, iron, ruthenium, osmium cobalt, rhodium, iridium, nickel, palladium and platinum. Suitable low-valent organometallic compounds of metals of Groups VI–B, VII–B and VIII have at least two ligands independently selected from (i) carbon monoxide, (ii) tertiary organophosphine of from 3 to 60 carbon atoms and (iii) cyclopentadienyl ligand of from 5 to 30 carbon atoms.

The telomerization of alkyl iodides with iron, copper or zinc metal catalyst is described in copending application, Ser. No. 832,465, of Nakamaye et al., common assignee, filed of even date, the telomerization of alkyl iodides with a copper chelate of a β-dicarbonylic compound monoenolate is described in copending application, Ser. No. 832,431 of Spooncer, common assignee, filed of even date, and the telomerization of alkyl iodides with a low-valent organometallic catalyst of a metal of Groups VI–B, VII–B or VIII is described in applicants' copending application Ser. No. 833,891, filed of even date. The disclosure of these copending applications are herewith incorporated by reference.

The telomerization reaction is conducted in the liquid phase in the presence of a reaction diluent which is liquid at reaction temperature and pressure and is inert to the reactants, catalyst and the products produced therefrom. Suitable diluents are non-hydroxylic diluents, such as hydrocarbons free from aliphatic unsaturation, e.g., hexane, heptane, decane, octane, dodecane, cyclohexane, tetrahydronaphthalene, benzene, toluene and xylene. Preferred reaction diluents comprise mononuclear aromatic hydrocarbons of from 6 to 12 carbon atoms. Amounts of reaction diluent up to about 30 times the weight of alkyl iodide reactant are typically employed.

The telomerization process is conducted by any of a variety of procedures. In one modification, the ethylene, iodide reactant, catalyst and diluent are charged to an autoclave or similar pressure reactor for operation in a batchwise manner. In another modification, the process is effected in a continuous manner as by contacting the entire reaction mixture during passage through a tubular reactor. By any modification, the process is most efficiently conducted at elevated temperature and pressure. In general, temperatures varying from about 50° C. to about 250° C. are satisfactory with temperatures from about 75° C. to about 200 C. being preferred. Suitable reaction pressures are those which serve to maintain the reaction mixture substantially in the liquid phase. Reaction pressures from about 10 atmospheres to about 200 atmospheres in general are satisfactory. The telomerization reaction is suitably conducted in an inert reaction environment so that the presence of reactive materials such as water and oxygen is desirably avoided. Reaction conditions are therefore substantially anhydrous and substantially oxygen-free.

Separation zone

The product mixture from the telomerization zone is passed to the separation zone II. The separation zone II may comprise a suitable fractionation unit or similar conventional separation apparatus. Unreacted ethyl iodide and ethylene as well as any recoverd catalyst and diluent are recycled to the telomerization zone I. The linear primary alkyl iodide telomer product is separated and passed to the dehydroiodination zone. Alternatively, the alkyl iodide telomers are separated into a higher alkyl iodide telomer fraction of a selected range of carbon atoms and a lower intermediate alkyl iodide fraction. The range of carbon atoms of the higher alkyl iodide telomers can be any suitable range desired. Useful range of carbon atoms vary from about 2 carbon-numbers to 10 carbon-numbers, e.g., $C_8$–$C_{10}$, $C_8$–$C_{12}$, $C_8$–$C_{14}$, $C_8$–$C_{16}$, $C_{10}$–$C_{12}$, $C_{10}$–$C_{14}$, $C_{10}$–$C_{16}$, $C_{10}$–$C_{20}$, $C_{12}$–$C_{16}$, $C_{14}$–$C_{20}$, $C_{20}$–$C_{24}$, and the like. The lower alkyl iodide fraction includes from $C_4$ (butyl iodide) up to the carbon-number of the highest alkyl iodide in the higher alkyl iodide fraction, but preferably includes only from $C_4$ up to the carbon-number of the lowest alkyl iodide in the higher alkyl iodide fraction.

Dehydroiodination

In the dehydroiodination zone III linear primary, alkyl iodide telomers are converted to linear alpha-olefins and hydrogen iodide. In one modification, the dehydroiodination reaction is conducted by thermal decomposition of the alkyl iodide at elevated temperatures, e.g., 100° C. to 500 C. In another modification, the dehydroiodination is conducted in the presence of conventional basis-type dehydrogenation catalysts such as nickel oxide or acidic-type dehydrohalogenation catalysts such as acidic metal oxides, siliceous refractory and metal salts. Illustrative acidic oxides include alumina, chomia, thoria and titania; illustrative siliceous refractory oxides include silica-alumina, silica–magnesia, silica-titania and silica-magnesia-zirconia; and illustrative metal salts include neutral salts, e.g., magnesium chloride, lithium borate and barium chloride, and Friedel-Crafts type, e.g., stannic chloride, ferric chloride, zinc chloride and aluminum chloride.

The dehydroiodination is preferably conducted in the fluid phase, with or without the presence of an added inert diluent or solvent. When a diluent is employed, the diluent is suitably a saturated aliphatic or cycloaliphatic hydrocarbon solvent which is fluid at the reaction temperatures and pressures employed. Suitable aliphatic hydrocarbon solvents comprise alkanes of straight chain and cyclic structure such as isopentane, hexane, octane, isooctane, decane, cyclohexane, cyclopentane, methylcyclopentane, and decalin. Other suitable diluents are inert gases such as nitrogen or argon.

The dehydroiodination reaction may be carried out batchwise, intermittently or continuously. By any method of operation, reaction conditions generally comprise the use of elevated temperature and pressure. Temperatures employed will depend to some extent on presence or absence of a catalyst. In general, temperatures of from about 50° C. to about 500° C., more preferably from about 100° C. to about 300° C. are employed. Suitable pressures may vary from about 1 atmosphere to about 100 atmospheres.

Subsequent to the dehydroiodination of the alkyl iodide, the resulting reaction mixtures are separated by conventional means such as fractional distillation, selective extraction, and the like to provide linear, alpha-olefins which are recovered as products and hydrogen iodide which is employed for hydroiodination of ethylene.

Hydroiodination.

The preparation of ethyl iodide by the reaction of hydrogen diodide and ethylene in the hydroiodination zone IV can be conducted by any more or less conventional method. In one modification, ethylene and hydrogen iodide are contacted in the fluid phase, e.g., liquid or gaseous, in the presence or absence of an inert reaction diluent. In another modification, ethylene and hydrogen iodide are contacted in the presence of a conventional hydrohalogenation catalyst. By any modification, suitable, reaction temperatures and pressures vary over a wide range. Temperatures varying from −20° to 500° C. and pressures varying from 1 atmosphere to 100 atmospheres are generally satisfactory.

Subsequent to the hydroiodination reaction, the ethyl iodide product is separated by conventional means such as fractional distillation, selective extraction and the like. The ethyl iodide is recycled to the telomerization reactor.

Although it is preferable to carry out the hydroiodination reaction in a separate reaction zone (V), this reaction can be effected within the telomerization zone (I) itself thereby eliminating the requirement of a separate hydroiodination zone. By control of the reaction conditions in the telomerization zone (I) substantially complete reaction of hydrogen iodide with excess ethylene can be caused to take place with no detrimental effect on the telomerization reaction.

EXAMPLE I

The telomerization of ethylene with ethyl iodide in the presence of bis(triphenylphosphine)tricarbonylruthenium as catalyst in benzene solvent is conducted in an autoclave designated in the drawing as telomerization zone I. Catalyst to ethyl iodide molar ratio of 1:40 and ethylene to ethyl iodide molar ratio of 20:1 are employed. The autoclave is maintained at a temperature of 150° C. and a pressure of 1000–1500 p.s.i.g. The alkyl iodide components of the resulting product mixture comprise 22 mole percent unreacted ethyl iodide, 20 mole percent n-butyl iodide, 20 mole percent n-hexyl iodide, 15 mole percent n-octyl iodide, 10 mole percent n-decyliodide, 6 mole percent n-dodecyl iodide, 4 mole percent n-tetradecyl iodide, 2 mole percent n-hexadecyl iodide and 1 mole percent n-octadecyl iodide.

The product mixture is withdrawn and the ethylene, catalyst, benzene and $C_2$ to $C_{10}$ n-alkyl iodide products are separated and recycled to the telomerization reactor. The $C_{12}$ to $C_{18}$ n-alkyl iodide products are fed at a liquid hourly space velocity (vol./vol./hr.) of 1.1 to a tubular reactor, designated in the drawing as dehydroiodination zone III, packed with 10% wt. lithium borate on diatomaceous earth and maintained at 250° C. The effluent from the dehydroiodination reactor is passed into water. After the effluent and water are thoroughly shaken to remove hydrogen iodide from the resulting n-alkene phase, the n-alkene phase is separated and recovered as product.

The aqueous hydrogen iodide phase is contacted with excess ethylene in an autoclave, designated as the hydroiodination zone IV, which is maintained at 100–150° C. The resulting ethyl iodide product and unreacted ethylene are separated and employed for recycle to the telomerization zone I.

EXAMPLE II

The telomerization of ethylene with n-butyl iodide and n-hexyl iodide was conducted in the presence of bis(triphenylphosphine)tricarbonylruthenium as catalyst. Each reaction was conducted with 0.5 millimole of the catalyst, 20 millimoles of the indicated alkyl iodide, 30 ml. of benzene and at an initial ethylene pressure of 800 p.s.i.g. and at a temperature of 125° C. The reaction conditions and results are provided in Table I.

TABLE I

| Run | 1 | 2 |
|---|---|---|
| Alkyl iodide reactant | n-Butyl | n-Hexy |
| Conversion of alkyl iodide, percent | 58 | 33 |
| Product selectivity, mole percent: | | |
| n-Hexyl iodide | 40 | |
| n-Octyl iodide | 26 | 53 |
| n-Decyl iodide | 16 | 30 |
| n-Dodecyl iodide | 10 | 14 |
| n-Tetradecyl iodide | 6 | 4 |

We claim as our invention:

1. A process of converting ethylene to linear alpha-olefins by:
   (1) telomerizing in a first reaction zone ethylene and ethyl iodide to a mixture of even-carbon-number linear primary alkyl iodide telomers in the presence of a catalyst selected from (a) iron metal, (b) copper metal, (c) zinc metal, (d) a copper chelate of a β-dicarbonylic compound monoenolate and (e) a low-valent organometallic compound of a metal of Groups VI–B, VII–B or VIII of the Periodic Table, said organometallic compound having at least two ligands independently selected from (i) carbon monoxide, (ii) tertiary organophosphine of from 3 to 60 carbon atoms and (iii) cyclopentadienyl ligand of from 5 to 30 carbon atoms, in the liquid phase in inert reaction diluent at a temperature of from about 50° C. to about 250° C.;
   (2) separating and dehydroiodinating the mixture of alkyl iodide telomers to produce the linear alpha-olefin product and hydrogen iodide, and
   (3) hydroiodinating ethylene with the hydrogen iodide to produce ethyl iodide and recycling it to the first reaction zone.

2. A process of converting ethylene to linear alpha-olefins of a selected range of carbon atoms by:
   (1) telomerizing in a first reaction zone ethylene and ethyl iodide to a mixture of even-carbon-number linear primary alkyl iodide telomers in the presence of a catalyst selected from (a) iron metal, (b) copper metal, (c) zinc metal, (d) a copper chelate of a β-dicarbonylic compound monoenolate and (e) a low-valent organometallic compound of a metal of Groups VI–B, VII–B or VIII of the Periodic Table, said organometallic compound having at least two ligands independently selected from (i) carbon monoxide, (ii) tertiary organophosphine of from 3 to 60 carbon atoms and (iii) cyclopentadienyl ligand of from 5 to 30 carbon atoms, in the liquid phase in inert reaction diluent at a temperature of from about 50° C. to about 250° C.;
   (2) separating the mixture of alkyl iodide telomers into a higher alkyl iodide telomer fraction of a selected range of carbon atoms and a lower intermediate alkyl iodide telomer fraction;
   (3) returning the intermediate alkyl iodide telomer fraction to the first reaction zone for further telomerization with ethylene;
   (4) dehydroiodinating the higher alkyl iodide telomer fraction to produce corresponding linear alpha-olefin product and hydrogen iodide;
   (5) hydroiodinating ethylene with hydrogen iodide from (4) to produce ethyl iodide and recycling it for further telomerization in the first reaction zone.

3. The process of claim 2 wherein the range of carbon atoms of the higher alkyl iodide fraction is $C_{10}$–$C_{20}$.

4. A process of converting ethylene and ethyl iodide to linear primary alkyl iodides of a selected number of carbon atoms by:
   (1) telomerizing in a first reaction zone ethylene and ethyl iodide to a mixture of even-carbon-number linear primary alkyl iodide telomers in the presence of a catalyst selected from (a) iron metal, (b) copper metal, (c) zinc metal, (d) a copper chelate of a β-dicarbonylic compound monoenolate and (e) a low-valent organometallic compound of a metal of Groups VI–B, VII–B or VIII of the Periodic Table, said organometallic compound having at least two ligands independently selected from (i) carbon monoxide, (ii) tertiary organophosphine of from 3 to 60 carbon atoms and (iii) cyclopentadienyl ligand of from 5 to 30 carbon atoms, in the liquid phase in inert reaction diluent at a temperature of from about 50° C. to about 250° C.;
   (2) separating the mixture of alkyl iodide telomers into a higher alkyl iodide telomer fraction of a selected range of carbon atoms and a lower intermediate alkyl iodide telomer fraction;
   (3) recovering the higher alkyl iodide telomer fraction; and
   (4) recycling the intermediate alkyl iodide telomer fraction to the first reaction zone for further telomerization with ethylene to produce additional higher alkyl iodide telomers.

5. The process of claim 4 wherein the range of carbon atoms of the higher alkyl iodide telomer fraction is $C_{10}$–$C_{20}$.

6. The process of claim 3 wherein the catalyst is bis(triphenylphosphine)tricarbonylruthenium.

References Cited

UNITED STATES PATENTS

| 3,214,480 | 10/1965 | Hoffman | 260—658 |
| 3,268,602 | 8/1966 | Goble et al. | 260—654 |
| 3,080,435 | 3/1963 | Nager | 260—677 |
| 3,275,704 | 9/1966 | Mill | 260—673 |
| 3,429,934 | 2/1969 | Nakagawa et al. | 260—649 |
| 2,837,580 | 6/1958 | Barnhart | 260—653 |
| 2,551,639 | 5/1951 | Feasley et al. | 260—653 |
| 2,438,021 | 3/1948 | Roland | 260—654 |
| 2,533,052 | 12/1950 | Schmerling | 260—658 |

DELBERT E. GANTZ, Primary Examiner

J. M. NELSON, Assistant Examiner

U.S. Cl. X.R.

260—658, 683.1